United States Patent
Wright (10) Patent No.: US 9,836,281 B2
(45) Date of Patent: Dec. 5, 2017

(54) ENCRYPTION METHOD AND SYSTEM USING A RANDOM BIT STRING ENCRYPTION KEY

(71) Applicant: Greg J. Wright, Allen, TX (US)

(72) Inventor: Greg J. Wright, Allen, TX (US)

(*) Notice: Subject to any disclaimer, the term of this patent is extended or adjusted under 35 U.S.C. 154(b) by 84 days.

(21) Appl. No.: 14/204,895

(22) Filed: Mar. 11, 2014

(65) Prior Publication Data

US 2014/0325215 A1   Oct. 30, 2014

Related U.S. Application Data (60) Provisional application No. 61/777,815, filed on Mar. 12, 2013.

(51) Int. Cl.
| | | |
|---|---|---|
| *G06F 7/58* | (2006.01) | |
| *G06F 21/62* | (2013.01) | |
| *H04L 9/00* | (2006.01) | |
| *H04L 9/08* | (2006.01) | |

(52) U.S. Cl.
CPC .......... *G06F 7/588* (2013.01); *G06F 21/6209* (2013.01); *H04L 9/001* (2013.01); *H04L 9/0869* (2013.01); *H04L 2209/12* (2013.01)

(58) Field of Classification Search
CPC ....................................................... G06F 7/58
See application file for complete search history.

(56) References Cited

U.S. PATENT DOCUMENTS

| | | | |
|---|---|---|---|
| 6,751,318 B2 | 6/2004 | Crandall | |
| 7,100,055 B2 | 8/2006 | Owada et al. | |
| 8,245,042 B2 * | 8/2012 | Chinen | G06F 21/6209 380/241 |
| 8,868,898 B1 * | 10/2014 | Van Hoof | G06F 21/575 710/200 |
| 9,239,802 B1 * | 1/2016 | Wong | G06F 21/123 |
| 2003/0149869 A1 | 8/2003 | Gleichauf | |
| 2005/0027997 A1 * | 2/2005 | Ueno | G06F 21/34 713/193 |
| 2005/0175182 A1 * | 8/2005 | Ueno | G06F 21/602 380/277 |
| 2005/0226420 A1 | 10/2005 | Makela et al. | |
| 2005/0239439 A1 * | 10/2005 | Manabe | H04L 63/061 455/410 |

(Continued)

OTHER PUBLICATIONS

Sokil, AN2307, Nov. 2009, Cypress Semiconductor Corporation.*

(Continued)

*Primary Examiner* — Saleh Najjar
*Assistant Examiner* — Louis Teng
(74) *Attorney, Agent, or Firm* — Kirby B. Drake; Klemchuk LLP (57) ABSTRACT

Methods and systems for encrypting data are disclosed. A circuit uses a white noise generator to capture a random string of bits as an encryption key. The encryption key is generated at a central server and is provided to a subscriber on a physical memory device. The subscriber uses the encryption key to encrypt a source data file. The encrypted data file is sent to the central server, which uses the encryption key to decrypt the encrypted data file and to recover the source data file. The file name for the source data file may be encrypted into the encrypted data file and a new name assigned to the encrypted data file. A random number index may be used to identify the starting point of the encrypted file.

10 Claims, 4 Drawing Sheets

(56) References Cited

U.S. PATENT DOCUMENTS

| | | | | |
|---|---|---|---|---|
| 2006/0097806 | A1* | 5/2006 | Burdo | H03B 29/00 |
| | | | | 331/78 |
| 2007/0033320 | A1* | 2/2007 | Wu | G06F 21/602 |
| | | | | 711/100 |
| 2007/0186287 | A1* | 8/2007 | Slade | G06F 21/78 |
| | | | | 726/27 |
| 2007/0198636 | A1 | 8/2007 | Inamoto et al. | |
| 2008/0114990 | A1* | 5/2008 | Hilbert | G06F 21/78 |
| | | | | 713/189 |
| 2008/0123850 | A1 | 5/2008 | Bhatnagar et al. | |
| 2009/0006830 | A1* | 1/2009 | Zimmer | G06F 21/72 |
| | | | | 713/1 |
| 2009/0043807 | A1* | 2/2009 | Bittles | G06F 17/30911 |
| 2010/0146260 | A1* | 6/2010 | Levow | H04L 63/0245 |
| | | | | 713/154 |
| 2010/0313021 | A1 | 12/2010 | Xu et al. | |
| 2011/0317837 | A1 | 12/2011 | Smith | |
| 2013/0024700 | A1* | 1/2013 | Peterson | H03M 7/30 |
| | | | | 713/189 |
| 2013/0145429 | A1* | 6/2013 | Mendel | G06F 21/00 |
| | | | | 726/4 |
| 2013/0227677 | A1* | 8/2013 | Pal | G06F 21/33 |
| | | | | 726/19 |

OTHER PUBLICATIONS

Maxim Integrated, Building a Low-Cost White-Noise Generator, Application Note 3469, Mar. 14, 2005, 3 pages, available online at www.maximintegrated.com/app-notes/index.mvp/id/3459.

* cited by examiner

ENCRYPTION METHOD AND SYSTEM USING A RANDOM BIT STRING ENCRYPTION KEY

CROSS-REFERENCE TO RELATED APPLICATIONS

This application claims the benefit of the filing date of U.S. Provisional Patent Application No. 61/777,815, filed on Mar. 12, 2013, titled "Encryption Method and System," the disclosure of which is hereby incorporated by reference herein in its entirety.

BACKGROUND

Anyone who understands computer architecture knows that the basic unit of storage in memory is a byte. A byte consists of eight bits of information. A bit of information is represented by a binary 1 or 0. Therefore, a byte is a string of eight bits that spans from 00000000 to 11111111 in binary representation, which corresponds to 0 to 255 in a decimal representation. There are exactly 256 combinations of eight 1's and 0's that can be combined to form one byte.

If you open this document in electronic form using what is known as a hexadecimal ("hex") reader you would see an array of two-letter strings. Normally, you would see the equivalent alphabetic translations of the strings to the right of the array. The two-letter strings are the hexadecimal representation of the characters in the document. The equivalent alphabetic translations are known as ACSII (American Standard Code for Information Interchange). Hexadecimal is a compact way of showing the content of bytes. Each character of the hex string consists of either a number from 0-9 or an alphabetic character from A-F. The letter "N", for example, is represented by the hex string 4E. In binary, this hex string is represented by 01001110. Likewise the letter "n" is represented by the hex string 6E. In binary this hex string is represented by 01101110.

Furthermore, anyone who understands gambling understands its simplest form—flipping a coin. There is a 50% chance that the coin will come up as heads and a 50% chance that the coin will come up as tails. If you assign a binary "1" to heads (H) and a binary "0" to tails (T), then flipping a coin eight times will give you a string that is a random combination of eight 1's and/or 0's. Suppose, for example, that this random string is H-T-H-T-T-H-H-T, which corresponds to 10100110 in binary and A6 in hexadecimal. However, using this type of manual system to generate a random number string is not practical for use in automated and electronic systems or in systems requiring long random strings on the order of thousands of bits.

SUMMARY

In one embodiment, a circuit for generating a random bit string comprises a white noise source and an analog circuit having an input coupled to an output of the white noise source. The analog circuit has an output that varies between a high value and a low value based upon a signal from the white noise source. A digital circuit is coupled to the output of the analog circuit. The digital circuit samples the output of the analog circuit to generate the random bit string.

The white noise source may comprise one or more low noise amplifiers coupled to a reverse-biased Zener diode. The analog circuit may comprises a comparator circuit that compares the output of the white noise source to a filtered version of the output of the white noise source to generate the analog circuit output that varies between the high value and the low value. The high value may be, for example, 5 volts, and the low value may be 0 volts.

The digital circuit may comprise a clock providing a clock signal, and a data latch driven by the clock signal to sample the output of the analog circuit as a binary 1 value or a binary 0 value. An interface circuit may be driven the by clock signal to receive data samples from the data latch. The interface circuit may create the random bit string from the data samples. The interface circuit may be coupled to a memory device and may transfer the random bit string to the memory device.

In another embodiment, a method for encrypting data files uses a random bit string encryption key. A memory device is connected to a host device. The memory device stores the encryption key and a first verification code. A second verification code may be received at the host device from a remote device. The random bit string encryption key may be generated at the remote device using a white noise source. The host device may access the encryption key only if the first verification code matches the second verification code. A source data file stored on an external memory device may be encrypted using the encryption key. The encrypted file may then be sent from the host device to the remote device.

For security, the host device is disconnected from external network connections prior to connecting the encryption key memory device. The encryption key memory device and the external memory device storing the source data file are removed from the host computer after encrypting the data file. External network connections on the host device are reconnected after removing the encryption key memory device and the external memory device storing the source data file.

The data file from the host device is provided to a processor on the memory device. The data file on the memory device is encrypted using the encryption key stored on the memory device. The encrypted data file is then returned to the host device.

The file name of the data file may also be encrypted into the encrypted data file. A random index may also be encrypted into the encrypted data file. A new file name is assigned to the encrypted data file to protect the original, encrypted file name.

The encrypted data file may be sent from the host device and received at the remote device. The encrypted data file is decrypted using the encryption key and the embedded index. The data file is then re-encrypted using a second encryption key. The re-encrypted data file is forwarded to a second host device.

In a further embodiment, a method for decrypting data files uses a random bit string encryption key. An encrypted data file is received at a host device. A memory device is connected to the host device, wherein the memory device stores the encryption key and a first verification code. A second verification code is received from a remote device. The random bit string encryption key may be generated at the remote device using a white noise source. The encryption key is accessed only if the first verification code matches the second verification code. The encrypted data file is decrypted using the encryption key and an embedded index.

The host device is disconnected from external network connections prior to connecting the encryption key memory device. The decrypted data file is stored to a memory external to the host device. The external memory is disconnected from the host computer after storing the data file on the external memory. The encryption key memory device is removed from the host computer after decrypting the data file. An external network connection is reconnected after removing the memory device.

The encrypted data file is provided from the host device to a processor on the encryption key memory device. The data file on the memory device is decrypted using the encryption key stored on the memory device. The decrypted data file may be returned to the host device.

A file name may be decrypted from the encrypted data file and assigned to the file name to the decrypted data file.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Implementations of the disclosure now will be described more fully hereinafter with reference to the accompanying drawings. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. One skilled in the art may be able to use the various embodiments of the disclosure.

A file on a disk drive consists of a sequential set of hexadecimal characters. It does not matter if the file is for an executable program, a word document, a database, or a JPG picture file. The file on disk still consists of nothing more than a sequential set of hexadecimal characters. Using the method and system disclosed herein, one can create a file that consists of a sequential set of bytes that contain random binary or hexadecimal values. You can open this file using a hexadecimal viewer to see the random bytes, but any attempt to open the file containing random bytes using an application such as a word processer will result in the application giving a file opening error because the application will not recognize the file.

In one embodiment, the encryption method and system comprises using a white noise source that is amplified and then sampled using digital circuitry. The white noise source is sampled one bit at a time by a microprocessor. Each bit is placed in bit 0 of memory location inside the microprocessor, and shifted left using a shift instruction. Once this operation has happened eight times, a byte of completely random information has been formed. This byte can have any value from 0 to 255. After an arbitrary number of bytes have been collected by the microprocessor, they are transmitted to a host computer through a USB interface. They are placed in a file on disk and this file becomes the encryption key. It contains completely random information. In the past encryption has worked by using pseudorandom number generators. The keys are created using mathematical algorithms. Any algorithmic key is subject to breaking by one or more supercomputers. The method of generating a key disclosed herein is not subject to breaking by a supercomputer because there is no algorithm involved. The method disclosed herein makes any encrypted file theoretically unbreakable by any entity.

In one embodiment, a method of encrypting data involves byte-by-byte addition and subtraction. Inside every digital computer there exists an ADD or addition instruction that allows the processor to add two bytes of data together. In addition there exists an SUB or subtract instruction that allows the processor to subtract two bytes of data. Two of the simplest mathematical equations are: a+b=c (Eq. 1) and a=c−b (Eq. 2). In one embodiment, an XOR function may be used instead of addition and subtraction. The encryption method takes a file to be encrypted (i.e., source file) and adds it byte-by-byte to an encryption file that contains a sequence of random value bytes to create an encrypted file that is the same length as the source file. The encryption file does not have to be the same length as the source file. So, Equation 1 translates to: source file+encryption file=encrypted file, and Equation 2 translates to: encrypted file−encryption file=source file. If the end of file is reached in the encryption file before the source file is encrypted, then the encryption file is set back to the beginning of the file (i.e., wraps around) and the encryption process using this method is continued until it is completed. Once the encrypted file is created it can be transmitted over the Internet or any other network, and it will be theoretically impossible for the encrypted file to be decrypted no matter how many super computers anyone throws at it. At the receiving end of the internet, the source file can be recovered by subtracting the encryption file from the encrypted file byte-by-byte using an appropriate program.

Figure 1:
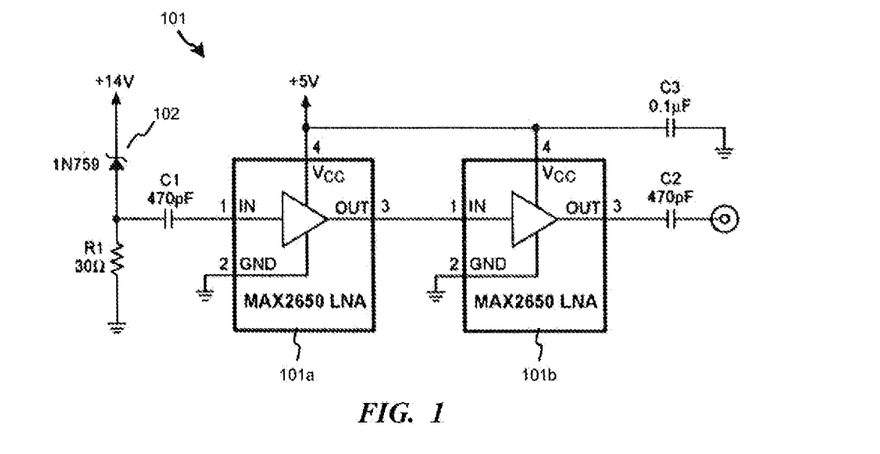
FIG. 1 is a schematic diagram of a white noise generator circuit 100 according to one embodiment.

In one embodiment, in order to create an encryption file you need what is known as a white noise generator. FIG. 1 is a schematic diagram of a white noise generator circuit 100 according to one embodiment. It will be understood that any white noise generator circuit may be used with the encryption method and system disclosed herein and that circuit 100 is provided for illustration purposes only. An example of a white noise generator can be found in application note AN3469 written by Maxim Semiconductor Corporation, the disclosure of which is incorporated by reference herein.

In circuit 100, two low-noise amplifiers (LNAs) 101*a-b* in cascade amplify the noise produced by a reverse-biased Zener diode 102 operating in junction-breakdown mode, producing white noise with a bandwidth of several hundred megahertz. Test results show that a fairly wideband white noise can be generated using several inexpensive components. White noise, which is defined as noise with constant power spectrum, is useful for measuring and testing wideband communication circuits. Commercially available white noise generators are usually very expensive. The design illustrated in FIG. 1 is an inexpensive method that produces white noise up to several hundred MHz.

White noise generator circuit 100 is based on the avalanche noise generated by a Zener breakdown phenomenon. It is created when a PN junction is operated in the reverse breakdown mode. The avalanche noise is very similar to shot noise, but much more intense and has a flat frequency spectrum (white). The magnitude of the noise is difficult to predict due to its dependence on the materials. Basically circuit 100 has two portions: a Zener diode 102, and two LNAs 101a-b, such as MAX2650 Low Noise Amplifiers available from Maxim Integrated Products. The diode is reverse-biased and noise output is taken from the anode. The MAX2650 is a wide-band Low-Noise Amplifier with 19 dB gain operating from DC to 1 GHz.

The white noise generator circuit may be realized with two boards a first board for the Zener diode 102, and a second board for the MAX2650 LNAs 101a-b. The output trace from the anode of the Zener diode 102 to the input of the LNA 101a may be 50Ω. For practical purpose, noise power of −60 dBm or above is desired within the frequency band of interest. The noise output power is mostly decided by the diode's breakdown voltage. A 12V Zener diode generated noise power is at least 15~20 dB higher than that generated by a 5V Zener diode. However, even with a 12V Zener diode, 20 dB gain from the LNA is not enough to produce noise power higher than −60 dBm. Accordingly, at least two LNAs 101 in cascade are used (38~40 dB gain). The output noise power is almost independent of the source current. The current into the diode 102 may be varied from 0 mA to 100 mA. Within this source current range, the noise power varies randomly within ±1 dB. In Zener diode breakdown phenomena, the avalanche noise dominates over other noise sources, such as shot noise (which is proportional to current), flicker noise and thermal noise.

Figure 2:
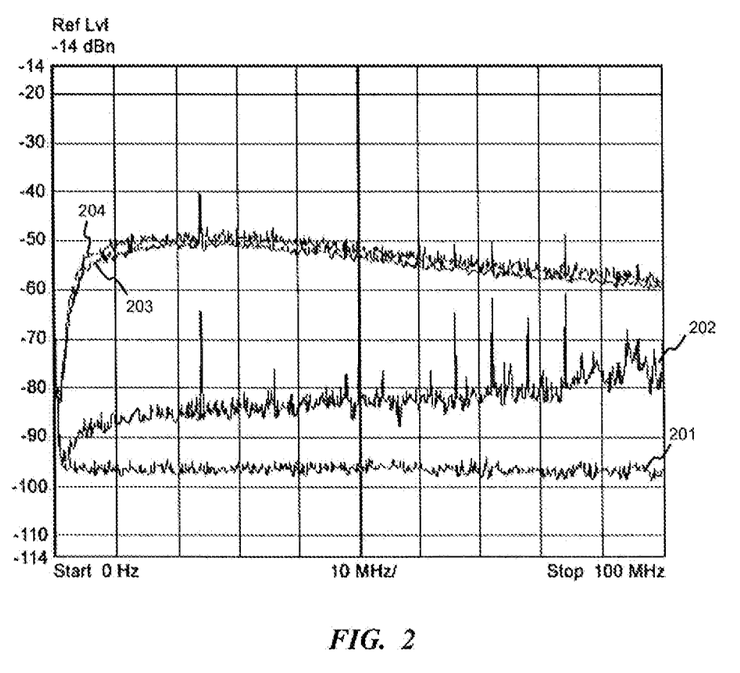
FIG. 2 illustrates the output spectrum from a white noise generator circuit as measured by a spectrum analyzer.

FIG. 2 illustrates the output spectrum from white noise generator circuit 100 as measured by a spectrum analyzer on the output of LNA 101b. The frequency/power spectrum of the output noise from circuit 100 is not perfectly flat over a wide frequency range. As shown in FIG. 2, from 1 MHz to 100 MHz, noise power drops almost 10 dB, which may be due to higher on-board attenuation for higher frequency components. The bottom curve 201 is the instrument noise floor (measured when everything is OFF). The second curve 202 is the noise output from LNA 101b when the Zener diode 102 is OFF. The top two curves 203, 204 are the noise output spectrum at 10 mA and 60 mA diode currents, respectively.

Figure 3:
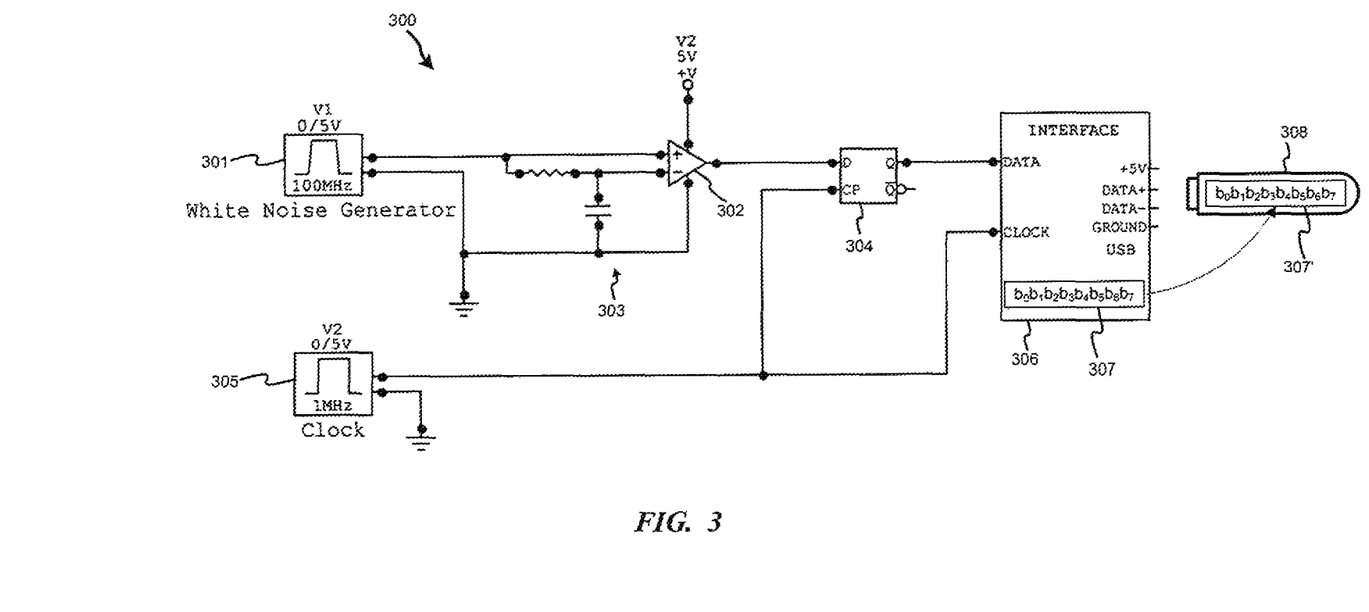
FIG. 3 illustrates an encryption circuit for generating an encryption key according to one embodiment.

FIG. 3 illustrates an encryption circuit 300 according to one embodiment. Once white noise of significant bandwidth has been generated, it can be digitized into 1's and 0's using circuit 300. White noise is generated in circuit 301, which may be white noise generator 200 (FIG. 2), for example. In some embodiments additional stages of amplification (not shown) may be added to circuit 200 to get the noise signal level to around 16 dBm for use in circuit 300. Other voltages may be generated to match the voltage of other logic families. The output of white noise generator 301 is compared to the DC value of the output using voltage comparator 302. R-C network 303 is used to provide the DC value of the output from white notice source 301. The output of the voltage comparator 302 converts white noise to digital white noise that varies from 0 to 5 volts.

The digital white noise from comparator 302 is captured at the data latch 304, which is driven by a 1 megahertz clock provided by clock 305. Other clock frequencies may be used. Once the digital noise value is latched in 304, the noise value can be clocked into interface 306 on the next falling edge of the clock. At this point, the data being latched into interface 306 has a 50% chance of being clocked in as a "1" and a 50% chance of being clocked in as a "0". A microprocessor inside interface 306 collects eight data samples (bits) from latch 304 and concatenates them together as bits $b_{0-7}$ to form byte 307. The byte 307 contains a random value from 00000000 to 11111111 in binary (corresponding to 0 to 255 in decimal).

These bytes 307 can then be transferred from interface 306 to an external memory device, such as USB memory device 308. For example, byte 307 can be stored to USB memory device 308 as byte 307. The USB memory device 308 may be used to transfer byte 307 to a computer, such as a personal computer (PC), laptop, notebook, tablet, etc., to be stored in an encryption file using an appropriate program running on the computer.

As discussed in further detail below, randomly created byte 307 may be used as an encryption key to encrypt a source file for secure transmission between computers. Although FIG. 3 illustrates the creation of a single byte 307, it will be understood that this is merely to simplify the description and that any number of bits and bytes may be randomly created using encryption circuit 300 to create an encryption key.

Additionally, although a USB memory device is described for transfer of the byte/encryption key 307, it will be understood that any portable memory device, such as a CompactFlash (CF), SmartMedia (SM), Miniature Card, Memory Stick, Multimedia Card (MMC), Secure Digital (SD) card, xD-Picture Card (xD), Subscriber Identity Module (SIM) card, Compact disc (CD), digital video disc (DVD), and the like, may be used to store and transfer byte/encryption key 307. In other embodiments, encryption circuit 300 may be part of or may have a direct connection to a computer that receives byte/encryption key 307 directly via a wired or wireless connection.

Figure 4:
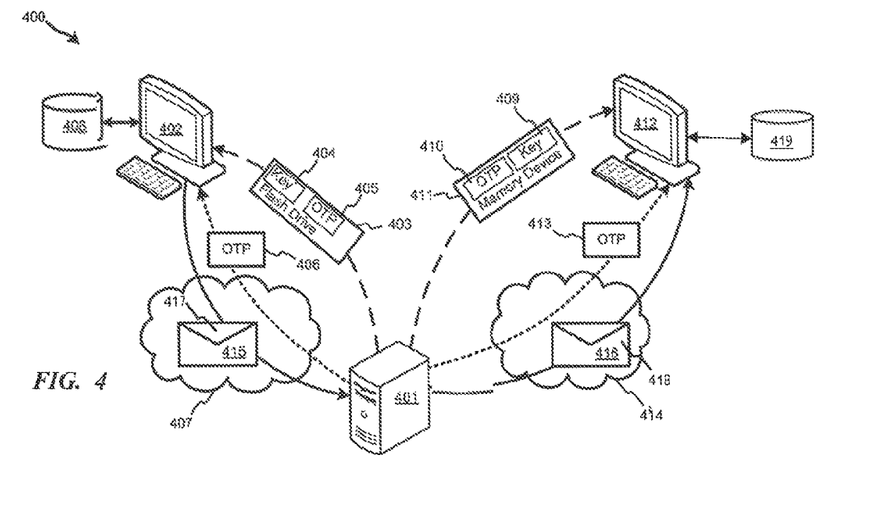
FIG. 4 illustrates an encryption system according to one embodiment.

FIG. 4 illustrates an encryption system 400 according to one embodiment. Encryption system 400 uses an encryption file (or encryption key). An encryption file may be created using encryption circuit 300 (FIG. 3), for example. The encryption file may be of any length. In the embodiment illustrated in FIG. 4, encryption system 400 uses an encryption file length of 64 kilobytes. This encryption file can be generated by taking 524,288 (i.e., 65,536×8) random samples of the white noise generator output.

In one embodiment, system 400 works as a subscription service. Server 401 generates encryption keys or receives the encryption keys from an external encryption circuit. Server 401 contains at least the same number of encryption keys as there are subscribers to the service. When a new user at computer 402 subscribes to the system, a flash drive 403 will be sent to the user. The flash drive contains a 64-kilobyte encryption key 404 that was created by the encryption circuit.

The microcontroller contained in the flash drive 403 may be programmed to not operate like a standard disk drive that can be accessed using a USB port on computer 402, such as by using Windows Explorer to read flash drive 403. Instead, after flash drive 403 is connected to the USB port on computer 402, flash drive 403 listens for what is known in the world of encryption as a one-time pad (OTP). OTP or embedded index 405 on flash drive 403 is another 64-kilobyte encryption file that was generated by server 401 using the encryption circuit. Once flash drive 403 is in the possession of the subscribing user, OTP 406 may be sent over network 407, which may be a private or public data network, such as the Internet. OTP or embedded index 405 as well as the encryption key 404 may be loaded on the flash drive 403 that the subscribing user receives. A database is maintained at the server 401 to keep track of subscribers, their encryption keys, and their OTPs. OTP 406 is used by a program on computer 402 to extract the user encryption key 404 from flash drive 403. The flash drive 403 will return the encryption key 404 only when it receives the correct OTP 406 that matches OTP or embedded index 405 used to encrypt encryption key 404.

To maintain optimum security, flash drive 403 should be connected to computer 402 only when computer 403 is disconnected from the Internet or external network 405. For the encryption system to work, the encryption key 404 of the subscriber must never be accessible by a computer when that computer is connected to the Internet. Also, when flash drive 403 is in transit, it must be protected from tampering. This can be accomplished, for example, by blowing a fuse in the flash drive microprocessor guaranteeing that the contents of the memory of the microprocessor cannot be read through its programming port. Additionally, the circuit board inside the case can be encased with epoxy, which is extremely difficult to penetrate without damaging the circuitry and the chips inside. If the flash drive 403 is shipped using one day air, then there will not be enough time for the data inside the microprocessor to be read by anyone and compromised. If the flash drive 403 is not received within one day, then it may be declared compromised and a new flash drive containing a new encryption key and new OTP can be shipped to the user.

The program that extracts the encryption key from flash drive 403 may write that key to an external drive 408, a CD, or a DVD. In some embodiments, the encryption key does not reside on the main hard drive or on any external storage device that is connected to computer 402 unless that computer is disconnected from the Internet or network 407. The drive 408 or external storage device that stores the encryption key is used only for purposes that never require a connection to the Internet or network 407.

Other subscribers receive their encryption key 409 and OTP 410 via a separate encryption key memory device 411, which may be any memory device requested by the subscriber that is appropriate for use with the subscriber's computer 412. The other subscriber then receives OTP 413 from server 401 via network 414. The encryption key 409 is extracted from the memory device 411 by an application on computer 412 if the OTP 410 on memory device 411 matches OTP 413. Network 414 may be any private or public data network, such as the Internet. Network 414 may be same network as network 407 or may be a different network.

For a subscriber to use the system, the subscriber must run a program at the encryption computer that selects a file to be encrypted. Then the computer will access the encryption key 404 and encrypt the file using the subscriber's encryption key 404 and the encryption method described above and store the resulting file on an external drive. Once the file to be sent has been encrypted, then the encrypted file is transferred to a computer 402 that is connected to the Internet 407. On the Internet-connected computer 402, a user program sends the encrypted file in a message 415 to the server 401 along with a source identification (402) of the sending subscriber and a destination address (412) of a receiving subscriber. The original file name may also be sent. The original file name can be encrypted for additional security and may be embedded in the encrypted file. The encrypted file may then have a different name that does not disclose the original, encrypted file name. In addition to the name of the file random-number index 417 and/or 418 may be encrypted and put into the encrypted file to identify a starting point for the encrypted file. This index will make it additionally hard to break into the encrypted file. Random-number index 417 and/or 418 will be stored at a fixed position in the encryption file and will not be indexed itself.

The server 401 decrypts the source subscriber's encrypted file 415 using the source subscriber's encryption key 404, which the server 401 will have in its database. Then the server 401 will re-encrypt the file using the destination subscriber's encryption key 409 and send the re-encrypted file in message 416 to the destination subscriber at computer 412 along with the original file name where the destination subscriber can decrypt the file using the destination subscriber's personal key 409 and random-number index 417 and/or 418 into the encryption key. Both the encrypted file name and the original file can both be recovered. Again, the encrypted file may be taken to a computer that is never connected to the Internet and that contains the decryption program and the receiving subscriber encryption key 409. The encryption key 409 is used both to encrypt data on server 401 and decrypt data at a receiving computer. The decrypted data file may be stored to external memory 419 which may be connected to host device 412.

Although a 64-kilobyte encryption key was used in the example above, it will be understood that the size of the encryption key may be any value that is appropriate based upon the size of the file to be encrypted, the relative security of the sender/receiver, the importance of the data being encrypted, or any other factor. For example, if financial data is being encrypted, then a relatively large random encryption key may be used. On the other hand, if personal correspondence or pictures are being encrypted, then a smaller encryption key may be used.

For encryption systems using a central server 401 to decrypt and re-encrypt files that are exchanged between two subscribers, the encryption keys for each subscriber may be of different lengths in addition to being different random bit strings.

In another embodiment, a microprocessor on the flash drive carrying an encryption key performs the encryption. For example, the following steps can be used to encrypt a file to send to the subscription server:

1. A program running on the encryption/decryption computer disconnects the computer from the Internet.
2. The program tells the user to connect the encryption/decryption flash drive to a USB port.
3. The program tells the user to connect an external drive containing the file to be encrypted to another USB port.
4. The program reads the file to be encrypted and sends it to the encryption/decryption flash drive and instructs the flash drive to encrypt the file.
5. The microprocessor on the encryption/decryption flash drive proceeds to encrypt the file using the random number encryption key that is stored in flash memory.
6. The microprocessor on the encryption/decryption flash drive returns the encrypted file to the host computer to store on its internal hard drive. The encrypted file may be assigned a designated encryption filename extension, such a *.enc.
7. The program instructs the user to disconnect the encryption/decryption flash drive and the external drive containing the file to be encrypted from the host computer.
8. The host computer reconnects to the Internet.
9. The host computer sends the encrypted file to the encryption/decryption server along with the original file name of the file. The file name may also be encrypted to protect its identity and may be embedded in the encrypted file. In addition to the name of the file, a random-number index may be encrypted and put into the encrypted file as a starting point for the encrypted file. This index will make it additionally hard to break into the encrypted file. The random-number index will be at a fixed position in the encryption file and will not be indexed itself.

10. The host computer deletes the encrypted file from the host computer's internal hard drive once the file has been sent.

This encryption method may also be used when the encryption/decryption is performed by the host computer. The method may also use standard algorithmic encryption such as AES to doubly encrypt the file to be encrypted, which would make it even more secure. For example, if a third party obtained the encryption key from the user's flash drive, it would still be very difficult to decrypt an encrypted file if a second layer of AES encryption had been added to the encrypted file.

The following steps are used to decrypt an encrypted file that is received by a subscriber:

1. A program running on the encryption/decryption computer disconnects the computer from the Internet.
2. The program tells the user to insert the encryption/decryption flash drive to a USB port.
3. The program tells the user to connect an external drive to another USB port in order to have a place to store the decrypted file.
4. The program reads the file to be decrypted and sends it to the encryption/decryption flash drive and instructs the flash drive to decrypt the file.
5. The microprocessor on the encryption/decryption flash drive proceeds to decrypt the file using the random number encryption key stored in flash memory and the random-number index into the encryption key.
6. The microprocessor on the encryption/decryption flash drive returns the decrypted file and the original name of the unencrypted file to the host computer.
7. The host computer stores the file on the external drive using the file's original name and deletes any copies of the decrypted file from the host computer's internal hard drive.
8. The program tells the user to disconnect the encryption/decryption flash drive and the external drive containing the decrypted file from the host computer.
9. The host computer reconnects to the Internet.
10. The destination subscriber now has possession of the decrypted file.

The server that operates as the man-in-the-middle in the example above must be a secure server. The program running on the server must only accept data received from the Internet and decrypt it. The program must then re-encrypt the data and send it on to its intended recipient. Unlike a browser, the server program must never attempt to execute any data coining in from the Internet. It must only treat it as data and nothing more. This means that any program that is encrypted and received by the server will be only treated as data and will be passed on without attempting to run or execute. Anything received from the Internet that is not coming from a subscriber is discarded.

In one embodiment, the server may be a special purpose server having a stand-alone program that disables the operating system in RAM once it is executed. If the computer had to be rebooted, it reloads the operating system from disk and the stand-alone program could be reloaded to take over the computer. This program would serve only one purpose, which is to wait to receive encrypted files from subscribers, decrypt the files, re-encrypt the files, and send them on to the intended receiver. A protocol would have to be established to recognize encrypted files from a subscriber and to know who the intended recipient is. A server set up in this manner will not need a firewall because there is no operating system to break into.

In addition to encrypting text communications, different versions of this system can be used to encrypt and decrypt voice or video data or any kind of digital traffic.

Figure 5:
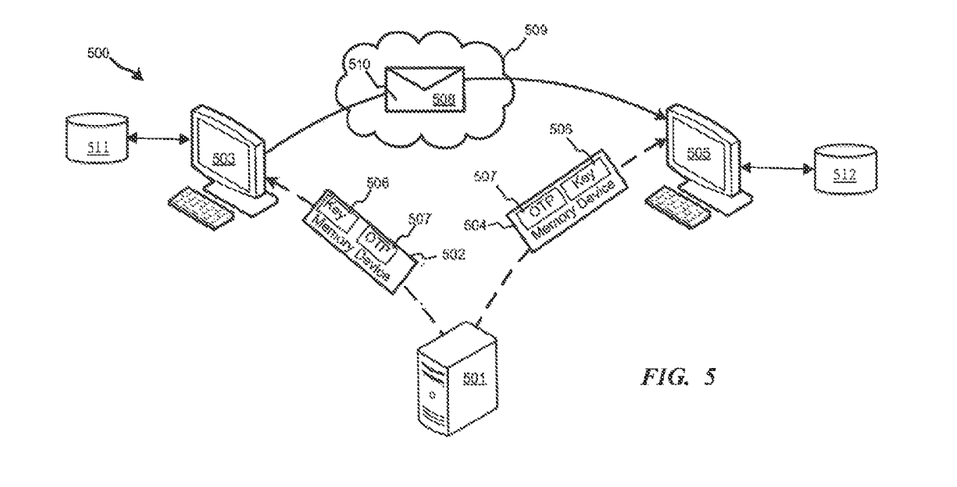
FIG. 5 illustrates an alternative embodiment of an encryption system in which subscribers may communicate directly to each other without using a central encryption server.

FIG. 5 illustrates an alternative embodiment of an encryption system 500 in which subscribers may communicate directly to each other without using a central encryption server. Server 501 sends a first memory device 502, such as a flash drive, to a first subscriber for use on computer 503. Server 501 also sends a second memory device 504 to a second subscriber for use on computer 505. Both memory devices 502, 504 contain the same encryption key 506 and may also include the same OTP or embedded index 507. Computers 503, 505 may confirm the encryption key 506 with server 501 using OTP or embedded index 507 as described above. Alternatively, once the encryption keys are sent, server 501 may delete the encryption keys to provide increased security and privacy to the subscribers.

The first subscriber may encrypt a file on computer 503 using encryption key 506. The encrypted data file may be stored to external memory 511 which may be connected to computer 503. Source computer 503 may then send the encrypted file as message 508 across a private or public data network 509 to destination computer 505. Upon receiving the encrypted file in message 508, computer 505 disconnects from network 509 and uses encryption key 506 to decrypt the encrypted file. The decrypted file may then be provided to the second subscriber. The decrypted data file may be stored to external memory 512 which may be connected to destination computer 505.

In this scenario, no third party or central server is required to allow the subscribers to communicate using a completely randomly generated encryption key.

Figure 6:
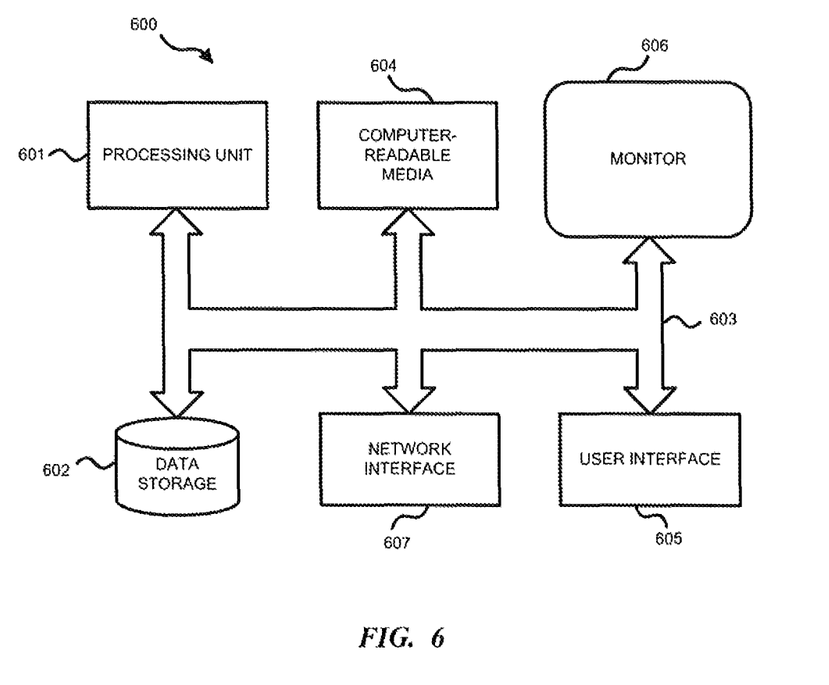
FIG. 6 illustrates an example of a suitable computing and networking environment for implement embodiments of the disclosure.

FIG. 6 illustrates an example of a suitable computing and networking environment 600 on which the computers and servers of FIGS. 3 and 4 may be implemented. The computing system environment 600 is only one example of a suitable computing environment and is not intended to suggest any limitation as to the scope of use or functionality of the disclosure. The disclosure is operational with numerous other general purpose or special purpose computing system environments or configurations. Examples of well-known computing systems, environments, and/or configurations that may be suitable for use with various implementations include, but are not limited to: personal computers, server computers, multiprocessor systems, microprocessor-based systems, network PCs, minicomputers, mainframe computers, distributed computing environments that include any of the above systems or devices, and the like.

Various implementations may be described in the general context of computer-executable instructions, such as program modules, being executed by a computer. Generally, program modules include routines, programs, objects, components, data structures, and so forth, which perform particular tasks or implement particular abstract data types. Various implementations may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the disclosure may include a general purpose computing device in the form of a computer

600. Components may include, but are not limited to, various hardware components, such as processing unit 601, data storage 602, such as a system memory, and system bus 603 that couples various system components including the data storage 602 to the processing unit 601. The system bus 603 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 600 typically includes a variety of computer-readable media 604. Computer-readable media 604 may be any available media that can be accessed by the computer 600 and includes both volatile and nonvolatile media, and removable and non-removable media, but excludes propagated signals. By way of example, and not limitation, computer-readable media 604 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 600. Communication media typically embodies computer-readable instructions, data structures, program modules or other data in a modulated data signal, such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 602 includes computer storage media in the form of volatile and/or nonvolatile memory such as read only memory (ROM) and random access memory (RAM). A basic input/output system (BIOS), containing the basic routines that help to transfer information between elements within computer 600, such as during start-up, is typically stored in ROM. RAM typically contains data and/or program modules that are immediately accessible to and/or presently being operated on by processing unit 601. By way of example, and not limitation, data storage 602 holds an operating system, application programs, and other program modules and program data.

Data storage 602 may also include other removable/non-removable, volatile/nonvolatile computer storage media. By way of example only, data storage 602 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 6, provide storage of computer-readable instructions, data structures, program modules and other data for the computer 600.

A user may enter commands and information through a user interface 605 or input device. The user input interface 605 may be coupled to the system bus 603, but may be connected by other interface and bus structures. A monitor 606 or other type of display device may also be connected to the system bus 603 via an interface, such as a video interface.

The computer 600 may operate in a networked or cloud-computing environment using logical connections 607 to one or more remote devices, such as a remote computer. The remote computer may be a personal computer, a server, a router, a network PC, a peer device or other common network node, and typically includes many or all of the elements described above relative to the computer 600. The logical connections depicted in FIG. 6 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 600 may be connected to a public or private network through a network interface or adapter 607. In some embodiments, a modem or other means may be provided for establishing communications over the network. The modem, which may be internal or external; may be connected to the system bus 603 via the network interface 607 or other appropriate mechanism. A wireless networking component such as comprising an interface and antenna may be coupled through a suitable device such as an access point or peer computer to a network. In a networked environment, program modules depicted relative to the computer 600, or portions thereof, may be stored in the remote memory storage device. It may be appreciated that the network connections shown are exemplary and other means of establishing a communications link between the computers may be used.

The subject matter described herein has outlined rather broadly the features and technical advantages of the present disclosure in order that the detailed description of the implementations may be better understood. Additional features and advantages of the disclosure described herein may form the subject of the claims of the implementations. It should be appreciated that the conception and specific embodiment disclosed may be readily utilized as a basis for modifying or designing other structures for carrying out the same purposes of the present disclosure. It should also be realized that such equivalent constructions do not depart from the disclosure as set forth in the appended claims. The novel features which are believed to be characteristic of the disclosure, both as to its organization and method of operation, together with further objects and advantages will be better understood from the preceding description when considered in connection with the accompanying figures. It is to be expressly understood, however, that each of the figures is provided for the purpose of illustration and description only and is not intended as a definition of the limits of the present disclosure.

What is claimed is:

1. A method for encrypting data files using a random bit string encryption key, comprising:
   generating the random bit string encryption key at a remote device using a white noise source sampled one bit at a time by a microprocessor,
      wherein an analog circuit output is generated that varies between a high value and a low value based upon a signal from the white noise source, and
      wherein a digital circuit coupled to the analog circuit samples the output of the analog circuit to generate the random bit string;
   connecting an encryption key memory device to a host device, the encryption key memory device storing the encryption key and a first verification code by saving the encryption key and the first verification code to the encryption key memory device without using an algorithmic key to generate the encryption key;
   receiving a second verification code by the host device from the remote device;
   disconnecting the host device from the Internet and external network connections prior to accessing the encryption key, wherein the encryption key is accessed only if the first verification code matches the second verification code;
   using a processor, encrypting a data file stored on an external memory device using the encryption key;
   connecting the remote device to the Internet and using a computer to send the encrypted file to the remote device; and
   connecting the host device to the Internet and sending the encrypted file from the remote device to the host device.

2. The method of claim 1, further comprising:
   disconnecting the host device from external network connections prior to connecting the encryption key memory device;
   removing the encryption key memory device and the external memory device storing the data file from the host computer after encrypting the data file; and
   reconnecting an external network connection after removing the encryption key memory device and the external memory device storing the data file.

3. The method of claim 1, further comprising:
   encrypting the data file on the encryption key memory device using the encryption key stored on the encryption key memory device; and
   returning the encrypted data file to the host device.

4. The method of claim 1, further comprising:
   encrypting a file name of the data file as part of the encrypted data file; and
   assigning a new file name to the encrypted data file.

5. The method of claim 1, further comprising:
   deleting the encrypted data file from the host device.

6. The method of claim 1, further comprising:
   receiving the encrypted data file at the remote device;
   decrypting the encrypted data file using the encryption key; and
   re-encrypting and
   forwarding the re-encrypted data file to a recipient.

7. A method for decrypting data files using a random bit string encryption key, comprising:
   generating the random bit string encryption key at a remote device using a white noise source sampled one bit at a time by a microprocessor,
      wherein an analog circuit output is generated that varies between a high value and a low value based upon a signal from the white noise source, and
      wherein a digital circuit coupled to the analog circuit samples the output of the analog circuit to generate the random bit string;
   receiving an encrypted data file at a host device;
   connecting an encryption key memory device to the host device, the encryption key memory device storing the encryption key and a first verification code by saving the encryption key and the first verification code to the encryption key memory device without using an algorithmic key to generate the encryption key;
   receiving a second verification code by the host device from the remote device;
   disconnecting the host device from the Internet and external network connections prior to accessing the encryption key, wherein the encryption key is accessed only if the first verification code matches the second verification code; and
   using a processor, decrypting the encrypted data file using the encryption key.

8. The method of claim 7, further comprising:
   connecting the remote device to the Internet;
   connecting the host device to the Internet and sending the encrypted data file from the remote device to the host device;
   disconnecting the host device from external network connections prior to connecting the encryption key memory device;
   storing the decrypted data file to an external memory to the host device;
   disconnecting the external memory from the host computer after storing the data file on the external memory;
   removing the encryption key memory device from the host computer; and
   reconnecting an external network connection after removing the encryption key memory device.

9. The method of claim 7, further comprising:
   providing the encrypted data file from the host device to a processor on the encryption key memory device.

10. The method of claim 7, further comprising:
    decrypting a file name from the encrypted data file; and
    assigning the file name to the decrypted data file.

* * * * *